United States Patent
Tanaka et al.

(10) Patent No.: US 6,799,244 B2
(45) Date of Patent: Sep. 28, 2004

(54) STORAGE CONTROL UNIT WITH A VOLATILE CACHE AND A NON-VOLATILE BACKUP CACHE FOR PROCESSING READ AND WRITE REQUESTS

(75) Inventors: Rie Tanaka, Odawara (JP); Atsushi Ishikawa, Odawara (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 10/313,383

(22) Filed: Dec. 6, 2002

(65) Prior Publication Data

US 2003/0084245 A1 May 1, 2003

Related U.S. Application Data

(63) Continuation of application No. 09/574,328, filed on May 19, 2000.

(30) Foreign Application Priority Data

Dec. 13, 1999 (JP) ............................................ 11-353595

(51) Int. Cl.[7] .............................................. G06F 12/00
(52) U.S. Cl. ....................... 711/113; 711/154; 713/340; 713/323
(58) Field of Search ................................ 711/113, 114, 711/112, 141, 145, 154, 156, 170, 166, 143; 710/22; 714/6, 13, 23; 712/228; 713/323, 324, 340

(56) References Cited

U.S. PATENT DOCUMENTS

| | | | |
|---|---|---|---|
| 4,916,605 A | | 4/1990 | Beardsley et al. |
| 4,920,478 A | | 4/1990 | Furuya et al. |
| 5,133,060 A | * | 7/1992 | Weber et al. ............... 711/113 |
| 5,437,022 A | | 7/1995 | Beardsley et al. |
| 5,778,426 A | | 7/1998 | DeKoning et al. |
| 5,867,702 A | * | 2/1999 | Lee ................................ 713/1 |
| 6,154,838 A | * | 11/2000 | Le et al. .......................... 713/2 |
| 6,233,680 B1 | * | 5/2001 | Bossen et al. .................. 713/1 |
| 6,233,697 B1 | * | 5/2001 | Yamamoto ...................... 714/6 |
| 6,243,789 B1 | * | 6/2001 | Hasbun et al. .............. 711/103 |
| 6,304,946 B1 | | 10/2001 | Mason |

(List continued on next page.)

FOREIGN PATENT DOCUMENTS

| | | |
|---|---|---|
| JP | 06028108 | 4/1994 |
| JP | 07056694 | 3/1995 |
| JP | 07121311 | 12/1995 |

OTHER PUBLICATIONS

Handy *The Cache Memory Book* 2nd edition, Academic Press Inc., p. 89 (1998).
Varma et al. "Destage algorithms for Disk arrays with Non–volital Caches," ACM 0–89791–698–0/95/0006 (1995).

*Primary Examiner*—Pierre Bataille
(74) *Attorney, Agent, or Firm*—Townsend and Townsend and Crew LLP

(57) ABSTRACT

A subsystem and a subsystem processing method are disclosed in which a storage control unit 2000 interposed between a plurality of disk units 3000 and a host computer 1000 has a nonvolatile cache 2400 for temporarily holding the read data/write data exchanged between the disk units 3000 and the host computer 1000. The management information for the user data in the cache 2400 is stored in both the in-cache management information area 2420 in the cache 2400 and the in-memory management information area 2221 in a volatile local memory 2210 accessible at high speed. Under normal conditions, the management information in the high speed in-memory management information area 2221 is accessed. At the time of a fault, on the other hand, the management information in the nonvolatile in-cache management information area 2420 is restored in the in-memory management information area 2221, thereby improving the access rate of the cache 2400.

41 Claims, 5 Drawing Sheets

U.S. PATENT DOCUMENTS 6,336,161 B1 * 1/2002 Watts .......................... 711/170
6,356,978 B1 * 3/2002 Kobayashi et al. ......... 711/113
6,463,507 B1 * 10/2002 Arimilli et al. ............. 711/122
6,467,029 B1 * 10/2002 Kitayama .................... 711/135
6,550,019 B1 * 4/2003 Ahrens et al. ................. 713/1
2001/0037475 A1 * 11/2001 Bradshaw et al. ............ 714/15

* cited by examiner

2221 : In-memory management information area
2420 : In-cache management information area

STORAGE CONTROL UNIT WITH A VOLATILE CACHE AND A NON-VOLATILE BACKUP CACHE FOR PROCESSING READ AND WRITE REQUESTS

This application is a continuation of co-pending, commonly owned U.S. patent application Ser. No. 09/574,328, filed May 19, 2000.

BACKGROUND OF THE INVENTION

The present invention relates to a technique for storage control, and in particular to a technique effectively applicable to a storage control unit or the like having a nonvolatile cache memory for temporarily storing user data.

Current market trends call for higher performance, larger capacity and lower cost storage units. In a redundant array of inexpensive disks (RAID), a plurality of disk units are configured in array. At the time data is written, a copy of the data is often written to a disk unit different from the one for storing the original write data. By doing so, in case of a fault in a disk unit in the array, the data in the defective disk unit can be "repaired" by the data in the redundant disk units, thereby improving reliability and maintainability of the disk units. With RAID, however, though the data reliability is improved, the operation of writing the redundant data increases the processing time, and therefore the write performance deteriorates.

For this reason, a write cache technique is indispensable for supporting RAID in the prior art. The write cache is mounted in the controller and the data are temporarily written to it. In response to the write request from the host, the data is written in this cache. Completion of the write operation is reported to the host at the same time that the data is written in the cache. Thus, the redundant data are generated, the write data and the redundant data are stored in the disk units asynchronously with the I/O processing for the host, thus preventing the deteriorated performance of the write operation.

SUMMARY OF THE INVENTION

The conventional method described above uses a technique for generating the redundant data and writing the write data and the redundant data into the disk units asynchronously with the host I/O processing. This technique, though providing improved responsiveness, cannot improve the processing performance of the control unit.

In addition, the use of the write cache is accompanied by the reporting of the completion of the write operation to the host at the same time that the data is written in the cache. This causes host data not reflected in the disk units to exist in the cache. To prevent data loss upon the occurrence of a fault such as a sudden power failure, therefore, the write cache is required to be nonvolatile. At the same time, not only the user data, but also the information for managing the user data is required to be stored in the write cache or other nonvolatile memory.

Such a write cache or a nonvolatile memory is located outside the processor. The access from the processor to the write cache or the nonvolatile memory, therefore, is slower than the access to the local memory in the processor. This also leads to a deterioration in processing performance.

This invention provides a subsystem which includes a plurality of storage units and a storage control unit interposed between the storage units and a host computer. The storage control unit controls the storage units based on an instruction from the host computer or controls the storage unit with a RAID protocol. The storage control unit includes a nonvolatile cache mechanism for storing the user data temporarily, and the management information for the user data in the cache is stored in both a low-speed nonvolatile memory and a high-speed volatile memory. Normally, the management information in the high-speed volatile memory is accessed at high speed. At the time of a sudden power failure or the like fault, data loss is prevented by the user data/management information in the nonvolatile memory.

To realize these control functions based on the control logic of a storage control unit, the invention provides a subsystem which writes the user data management information in both a low-speed nonvolatile memory and a high-speed volatile memory, which accesses the management information in the high-speed volatile memory under normal conditions, but accesses the management information in the nonvolatile memory in case of a sudden fault such as power failure. The system also restores the accessed information in the volatile memory.

DESCRIPTION OF THE SPECIFIC EMBODIMENTS

An embodiment of the invention will be described in detail below with reference to the drawings. Of course, the embodiment described is only an example, and as will be evident, the invention can be realized with other configurations.

Figure 1:
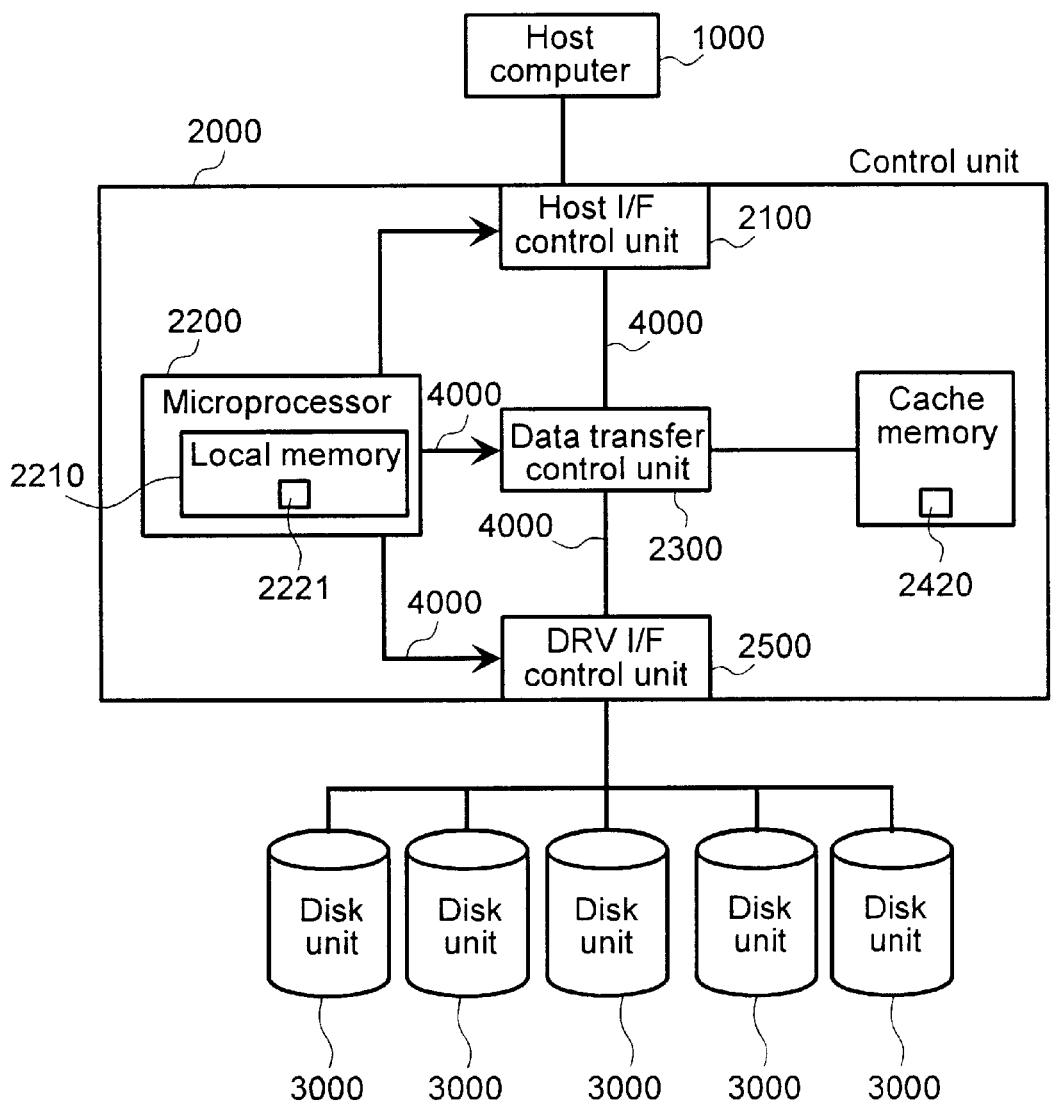
FIG. 1 is a schematic diagram showing one example configuration of a disk array system to which a storage control unit and a method for controlling a cache memory are applied according to an embodiment of the invention.

FIG. 1 is a schematic diagram showing an example configuration of a disk array system to which a storage control unit and a method of controlling a cache memory according to an embodiment of the invention. In FIG. 1 reference numeral 1000 designates a host computer which includes a central processing unit for processing data, numeral 2000 a storage control unit for controlling disk units, and numeral 3000 the disk units for storing the host data. The storage control unit 2000 can be included in a host housing by being inserted in a slot directly coupled to the host bus, included in an independent housing of the storage control unit or included in a subsystem with a disk unit built therein. The plurality of disk units 3000 can be in the form of a disk array. In such case, the user data received from the host computer 1000 under the RAID control of the storage control unit 2000 and the redundant data generated from the user data are stored distributively in the disk units 3000.

The storage control unit 2000 includes a host I/F control unit 2100 for protocol control with the host computer 1000, a microprocessor (hereinafter referred to as the processor) 2200 for controlling the controller, a data transfer control unit 2300 for executing the data transfer, a nonvolatile cache memory (referred to as a cache) 2400 used for temporarily storing the user data including the read data and the write data at the time of data transfer between the host computer 1000 and the disk units 3000, and a DRV I/F control unit 2500 for protocol control with each disk unit 3000. The processor 2200 also has built therein a local memory 2210.

Figure 2:
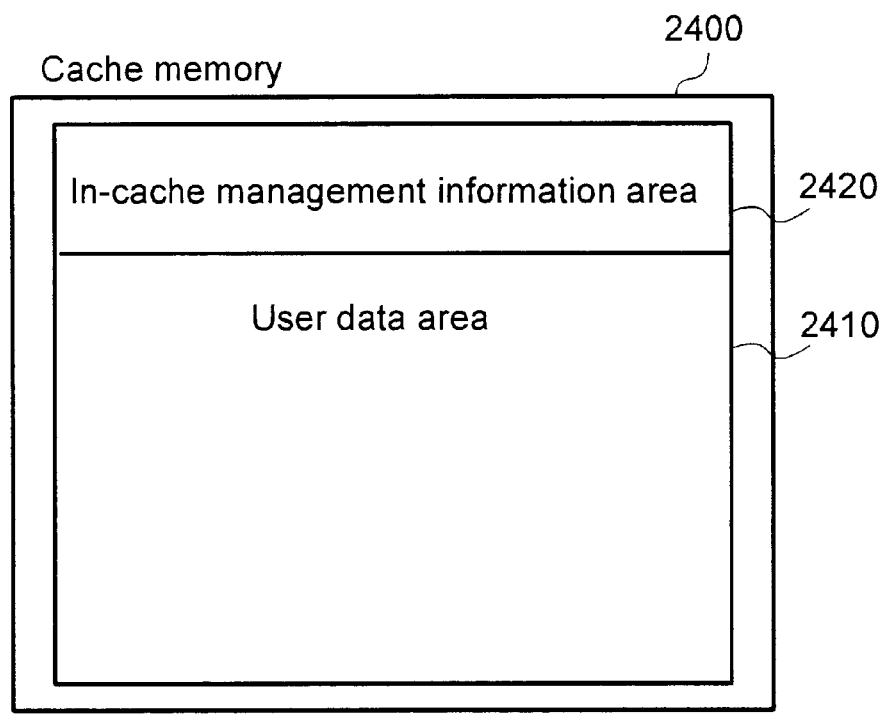
FIG. 2 is a schematic diagram showing an example of contents of the information in a cache memory in the storage control unit and the method of controlling the cache memory according to an embodiment of the invention.

The contents of the cache 2400 will be described with reference to FIG. 2. The cache 2400 includes a user data area 2410 and an in-cache management information area 2420 for managing the user data. User data are temporarily stored in the user data area 2410, while the in-cache management information area 2420 stores the data attribute (write data/ read data) required for managing the user data. It also can store the logic address of the user data designated by the host computer 1000, the available area information, and management information, such as the priority for replacing the contents of the cache. According to this embodiment, other nonvolatile memories can be used instead of the cache containing the management information area.

Figure 3:
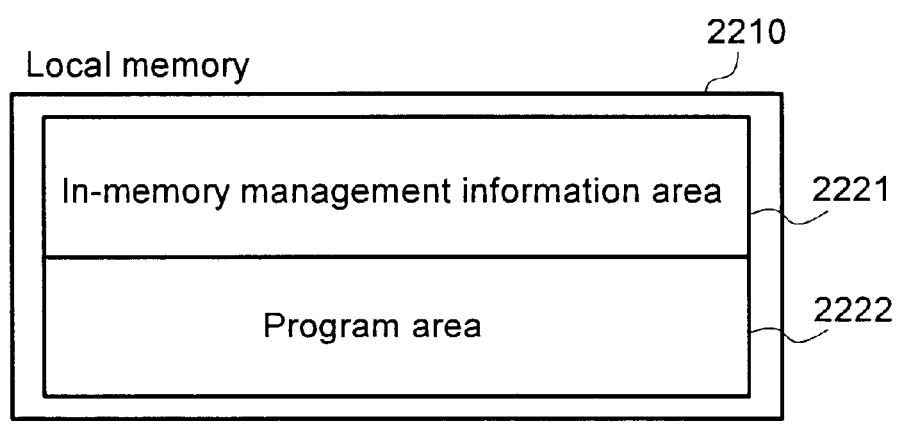
FIG. 3 is a schematic diagram showing an example of the contents of the information in a local memory in the storage control unit and the method of controlling the cache memory according to an embodiment of the invention.

The contents of the local memory 2210 will be explained with reference to FIG. 3. Local memory 2210 includes an in-memory management information area 2221 for storing information equivalent to the in-cache management information area 2420 described above, and a program area 2222 for storing a microprogram for controlling storage control unit 2000. Unlike this embodiment, the management information area can be located in a high-speed memory other than the local memory 2210.

The processor 2200 executes while sequentially decoding the program area and controls the storage control unit 2000. The processor 2200 also manages the data stored in the user data area 2410 by writing it in both the in cache management information area 2420 and the in-memory management information area 2221.

Local memory 2210 is located within the processor 2200 and therefore can be accessed by the processor at high speed. The cache 2400, on the other hand, corresponds to an external memory and therefore can be accessed only very slowly by the processor 2200. The recent development of the PCI bus described later and the employment of the posted write method has increased the write (update) speed of an external memory such as the cache 2400 to almost the same level as internal memory (local memory) 2210. Internal memory, however, usually has a higher read speed. Therefore, the overhead for the memory access can be reduced more by accessing the in-memory management information area 2221 than by accessing the in-cache management information area 2420.

Figure 4:
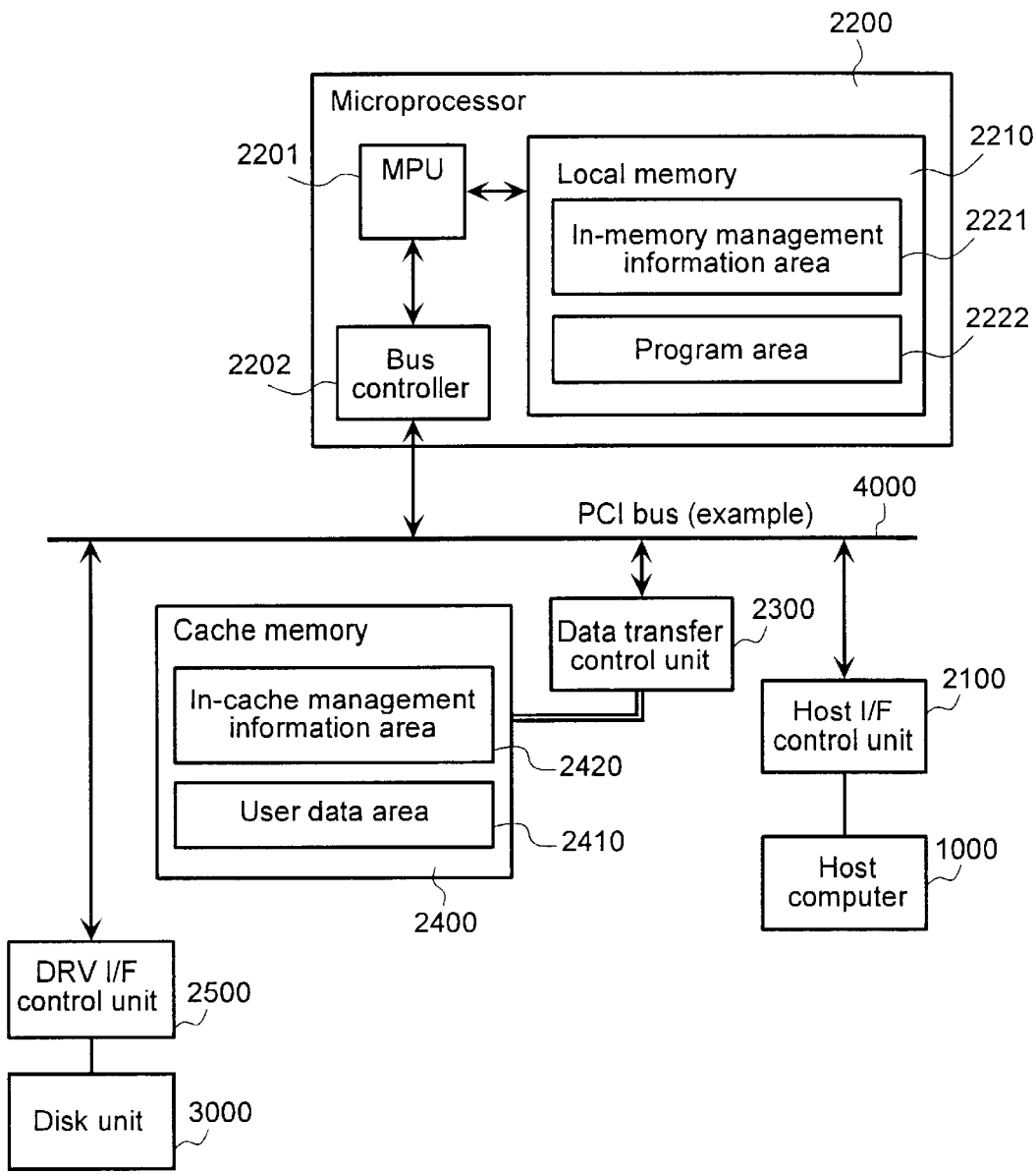
FIG. 4 is a schematic diagram showing an example configuration of a disk array system to which the storage control unit and the method of controlling the cache memory is applied according to an embodiment of the invention, in which the information is exchanged between a microprocessor and external units through a PCI bus.

FIG. 4 illustrates an example configuration for controlling the processor 2200, the host I/F control unit 2100, the underlying data transfer control unit 2300, the cache 2400 and the DRV I/F control unit 2500 using the PCI bus 4000. In this case, a microprocessor unit (MPU) 201 operated by the microprogram stored in the program area 2222 of the local memory 2210 and a bus controller 2202 for realizing the PCI bus I/F between the MPU 2201 and an external unit are arranged in the processor 2200.

In the posted data write operation in the cache 2400 through the bus controller 2202 from the MPU 2201, for example, the data write operation for the MPU 2201 is completed at the same time as the data write operation for the bus controller 2202. Therefore, a high-speed external data write operation is possible before completion of the write operation for the cache 2400. The data read operation for the MPU 2201 from an external cache 2400, etc., on the other hand, depends on the access rate of the cache 2400 and, as such, is usually not as fast (for example, in accessing the in-cache management information area 2420).

In view of this, according to this embodiment, the high-speed control operation of the cache 2400 is realized by accessing the in-memory management information area 2221 of the local memory 2210 holding equivalent management information instead of by accessing the in-cache management information area 2420 of the cache 2400.

The I/O processing from the host computer 1000 in the disk subsystem according to this embodiment will be explained with reference to FIGS. 1, 2, 3 and 6. An example of the write and read operations by the host computer 1000 is explained with reference to the flowchart of FIG. 6.

At the I/O request of the host computer 1000 (step 601), the processor 2200 determines whether the request is for write or read operation (step 602). For a write request, the user data area 2410 is searched for a vacant area to write the data in the user data area 2410 of the cache memory (step 603). In this operation, the processor 2200 searches not the low-speed in-cache management information area 2420, but the high-speed in-memory management information area 2221.

Once a vacant area is found, the host I/F control unit 2100 receives the write logic data and writes it into the vacant area through the data transfer control unit 2300 (step 604). Then, the in-cache management information area 2420 and the in-memory management information area 2221 are both updated (steps 605, 606). In the process, the processor 2200 may update both areas, or the data transfer control unit 2300 can automatically write the data both in the in-cache management information area 2420 and the in-memory management information area 2221 in response to an instruction from the processor 2200. The completion of the process is reported to the host computer 1000 (step 607), after which the data written in the cache memory is written in the disk units 3000 at an arbitrary timing (step 608).

In response to a request for a read operation, on the other hand, it is determined by reference to the management information whether the data requested from the host computer 1000 is available in the user data area 2410 (hit/miss step 609). In the absence of the data in the user data area 2410, the user data area 2410 is searched for a vacant area with reference to the management information in order to read the data in the user data, data area 2410 (step 610). Then, the data requested to read is transferred from the disk units 3000 to the vacant area thus found (step 611).

As the next step, both the in-cache management information area 2420 and the in-memory management information area 2221 are updated (steps 612, 613). As in the write operation, the processor 2200 may update both areas, or the data transfer control unit 2300 can write the data both in the in-cache management information area 2420 and the in-memory management information area 2221 automatically in response to an instruction from the processor 2200. Next, the requested data is transferred from the user data area 2410 to the host computer 1000. After being transferred, completion of the process is reported to the host computer (step 614).

In the aforementioned case, the high-speed local memory 2210 is accessed for the management information for the data in the cache 2400, while both the cache 2400 and the local memory 2210 are updated. As described above, the cache 2400 has a very low read access rate (about 20 times that of the local memory 2210, for example), while the write access rate of the cache 2400 is equivalent to that of the local memory due to the posted write operation. Therefore, this method is effective.

Specifically, the overhead reduction due to changing from the cache to the local memory for reading the management information is much larger than the increase in the overhead of writing the management information in both the cache 2400 and the local memory 2210.

The foregoing description concerns the operation of writing the data from the host computer 1000 into the cache 2400. According to this embodiment, the overhead also can be reduced in the subsequent operation of generating the redundant data asynchronously with the host computer 1000 and writing the write data and the redundant data into the disk units 3000. In writing the write data into the disk units 3000, for example, the user data area 2410 is required to be searched for the write data and the logic address of the particular data is required to be accessed to determine the write position of the write data. By accessing all such data management information in the high-speed in-memory management information area 2221, overhead is reduced and processing performance improved by increasing the data transfer rate through the cache 2400 in the storage control unit 2000.

As described above, in both the read and write operations, most of the overhead of the processor 2200 for controlling the data transfer between the host computer 1000 and the disk units 3000 resides in the access and update operation of the management information (2420 and 2221). The present embodiment reduces the overhead of the conspicuously low access rate in the conventional method, and can reduce the overhead considerably in all forms of access. This improves the speed of the storage control unit 2000.

Figure 5:
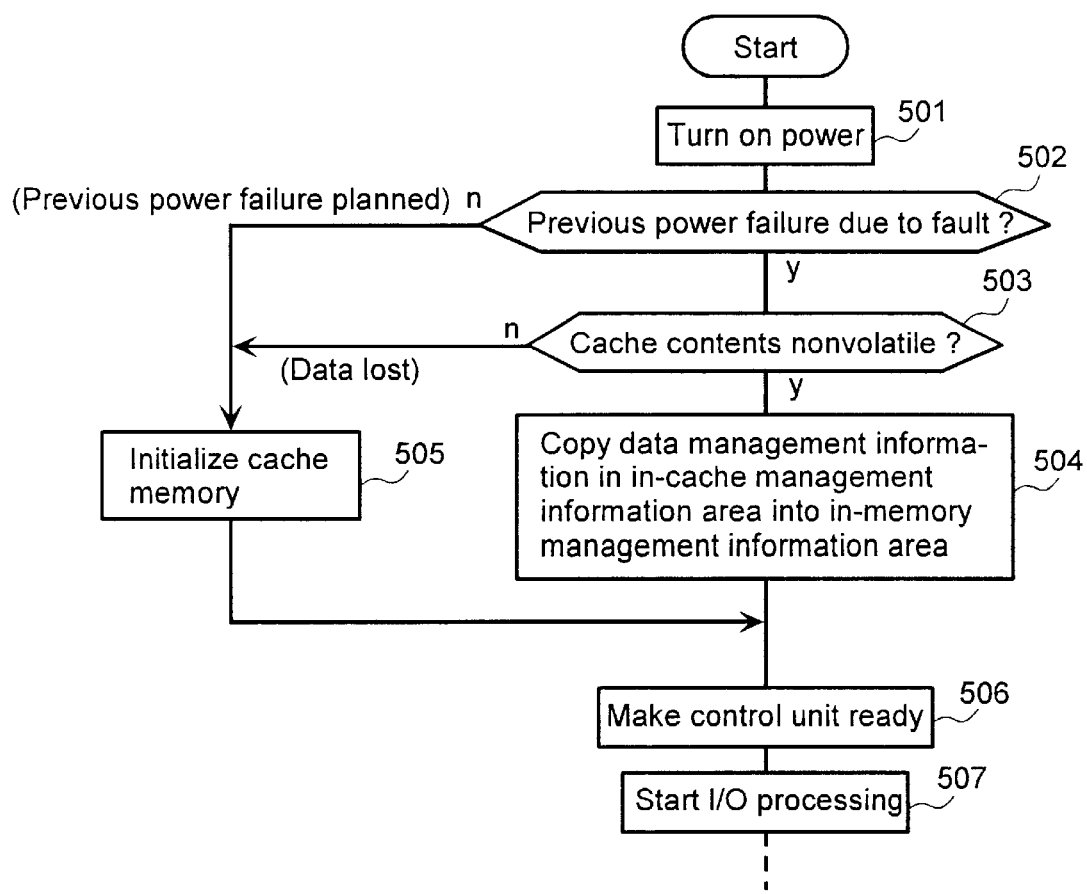
FIG. 5 is a flowchart showing an example of the storage control unit and the method for controlling the cache memory according to an embodiment of the invention.
Figure 6:
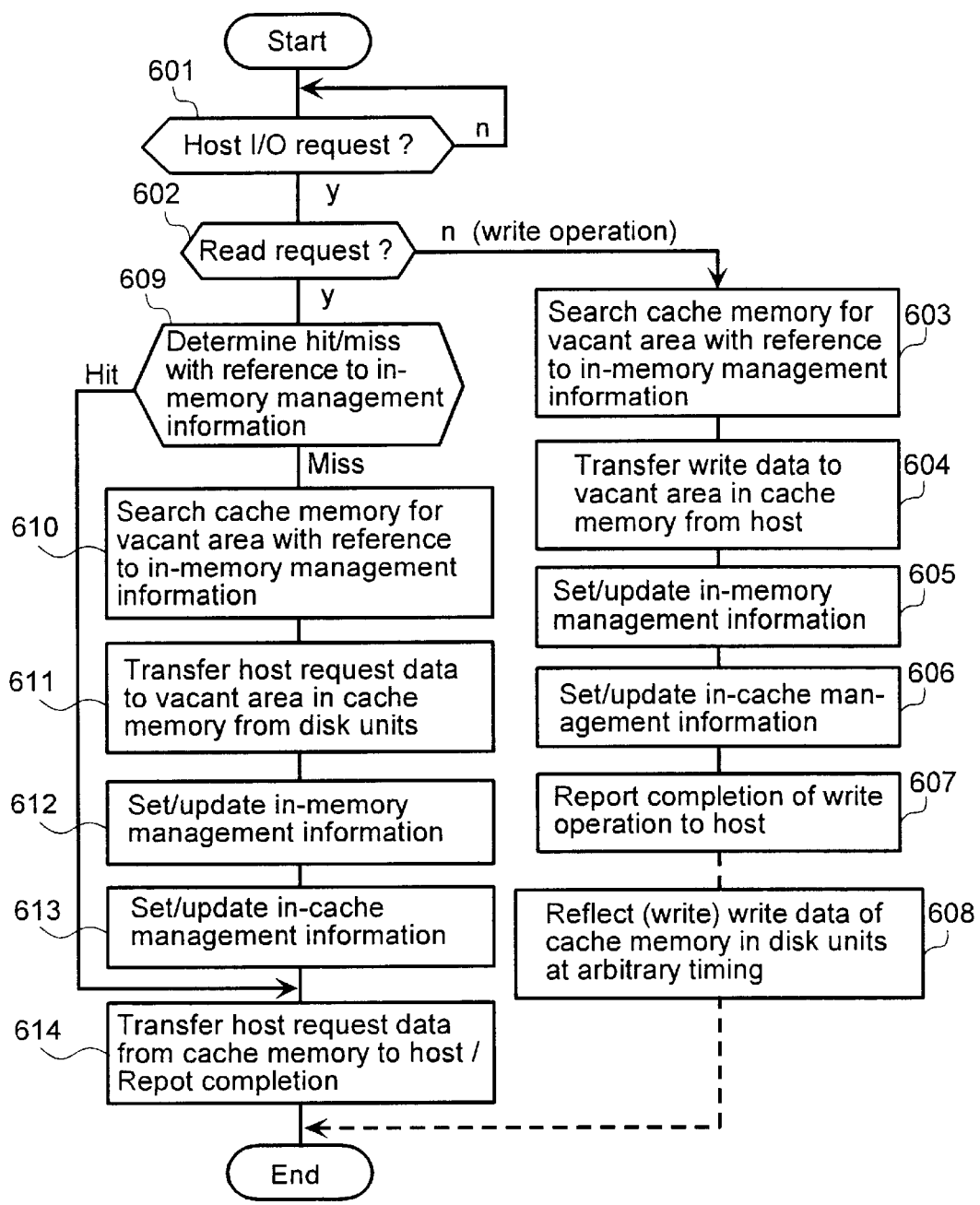
FIG. 6 is a flowchart showing an example of the storage control unit and the method for controlling the cache memory according to an embodiment of the invention.

Next a method of restoring a fault such as an abrupt power failure will be explained with reference to FIGS. 1, 2, 3 and 5. A series of processes for turning on power is illustrated in the flowchart of FIG. 5. If the power supply to the processor 2400 is interrupted by a fault, such as a power failure, the information in the local memory 2210, which generally constitutes the memory in the processor and is therefore volatile, is entirely lost. Because the cache 2400 is a non-volatile memory, information is held in both the user data area 2410 and the in-cache management information area 2420.

Once the power for the system is turned on (step 501), processor 2200 first determines whether the previous power failure was caused by a fault (or whether the power failure was planned). See step 502. If the power failure is due to a fault, the former information in the memory management information area 2221 that has been lost is restored by copying the management information in the in-cache management information area 2420 into the in-memory management information area 2221 (step 503). The management information in the local memory can be restored either by the processor 2200 itself or by the data transfer control unit 2300 in response to an instruction from the processor 2200.

During restoration of data, I/O processing from the host computer 1000 is temporarily suspended (the request from the host computer 1000 may not be accepted or the request may be accepted with queuing while suspending the execution), or the data management information is accessed from the in-cache management information area 2420. Once restoration of the in-memory management information area 2221 is completed, the control unit becomes operable and execution of I/O processing is continued (steps 506, 507).

If the power failure is a planned one, or if the power failure is caused by a fault, but the management information is depleted from the in-cache management information area 2420, the cache memory which includes the management information is initialized before restarting the operation (step 505). In this way, while the user data in the cache 2400 are apparently managed by the volatile local memory 2210 under normal conditions, data loss is prevented using the management information in the in-cache management information area 2420 of the nonvolatile cache 2400 at the time of a fault. Thus, the data transfer rate through the cache 2400 can be increased, without adversely affecting the reliability.

As described above, in the storage control unit and the cache memory control method according to this embodiment, the overhead of managing the access to the user data in the cache can be significantly reduced without adversely affecting the data reliability of the storage control unit. The result is that the processing performance of the storage control unit is improved in all types of access.

The invention, of which embodiments are specifically described above, is not limited to the embodiments and is of course modifiable variously without departing from the spirit of the invention. The preceding has been a description of the preferred embodiment of the invention. It will be appreciated that deviations and modifications can be made without departing from the scope of the invention, which is defined by the appended claims.

What is claimed is:

1. A method for booting a storage system comprising a plurality of storage units for storing data, and a storage control unit interposed between a host computer and the storage units, the storage control unit including a processor for controlling the transfer of data between the host computer and the storage units and including a cache memory for temporarily storing the data, the method comprising the steps of:

providing power to the storage system subsequent to a fault to begin recovering from the fault;

temporarily suspending processing by the host computer while the storage system is recovering from the fault;

recovering from the fault by copying management information in the cache memory of the storage system into a memory in the processor of the storage system, the management information relating to data that is stored in the cache memory at a time prior to occurrence of the fault; and restarting processing by the host computer subsequent to recovering from the fault.

2. The method of claim 1 further comprising:

receiving a write request from the host computer;

searching the cache memory for a vacant area within which to store write data corresponding to the write request;

temporarily storing the write data from the host computer in the vacant area;

updating the management information stored in the processor;

updating the management information stored in the cache memory; and storing the write data in at least one storage unit.

3. The method of claim 1 further comprising:
  receiving a read request from the host computer;
  searching the cache memory for the data requested;
  if the data requested is not in the cache memory, then copying the data into the cache memory from at least one storage unit;
  updating the management information in a processor with the data requested to be read;
  updating management information in the cache memory with the updated management information in the processor; and
  transferring the data requested to be read to the host computer.

4. A subsystem comprising a storage control unit and a plurality of storage units for storing data from a host computer wherein the storage control unit includes:
  a cache memory for temporarily storing data transferred between the host computer and the storage units;
  a processor for controlling the storage control unit; and
  a memory, which is accessed at a higher speed by the processor than the cache memory is accessed by the processor, the memory for storing management information about the data stored in the cache memory,
  wherein the management information comprises one or more of a data attribute required for managing the data in the cache memory, a logic address of the data in the cache memory designated by the management information, an available area information in the cache memory, and priority for replacing contents of the cache memory,
  wherein when the storage control unit receives a write request from the host computer, the processor searches the management information in the memory to identify a vacant area in the cache memory so that the processor writes the data from the host computer in the cache memory.

5. A subsystem according to claim 4 wherein the memory stores a control program for controlling the storage control unit.

6. A subsystem according to claim 4 wherein the memory comprises a volatile memory.

7. A subsystem according to claim 4 wherein the processor employs a posted write method for accessing the cache memory.

8. A subsystem according to claim 4 further comprising a data transfer control unit for transferring the data between the host computer, the storage units and the cache memory.

9. A subsystem according to claim 4 wherein the processor references the management information in the memory when the storage control unit receives a read request from the host computer, so that the processor determines whether data requested from the host computer is available in the cache memory.

10. A subsystem according to claim 4 wherein when the processor determines that data requested from the host computer is not available in the cache memory, the processor searches the management information in the memory for a vacant area in the cache memory so that the data requested from the host computer is transferred from the storage units to the vacant area in the cache memory.

11. A subsystem according to claim 4 wherein when the processor performs a write operation of write data, the processor searches the management information in the memory for a logic address of the write data stored in the cache memory so that the processor determines a write position of the write data in the storage units.

12. A subsystem according to claim 11 wherein the write data is a redundant data.

13. A subsystem according to claim 4 wherein when the processor performs a write operation of write data, the processor searches the management information in the memory for write data stored in the cache memory so that redundant data is generated by using the write data.

14. A subsystem according to claim 13 wherein the redundant data is generated asynchronously with I/O processing for the host computer.

15. A subsystem comprising a storage control unit and a plurality of storage units for storing data from a host computer wherein the storage control unit includes:
  a cache memory for temporarily storing data transferred between the host computer and the storage units;
  a processor for controlling the storage control unit; and
  a memory, which is accessed at a higher speed by the processor than the cache memory is accessed by the processor, the memory for storing management information about the data stored in the cache memory,
  wherein the management information comprises one or more of a data attribute required for managing the data in the cache memory, a logic address of the data in the cache memory designated by the management information, an available area information in the cache memory, and priority for replacing contents of the cache memory,
  wherein when the processor determines that a data requested from the host computer is not available in the cache memory, the processor searches the management information in the memory for a vacant area in the cache memory so that the data requested from the host computer is transferred from the storage units to the vacant area in the cache memory.

16. A subsystem according to claim 15 wherein the memory stores a control program for controlling the storage control unit.

17. A subsystem according to claim 15 wherein the memory comprises a volatile memory.

18. A subsystem according to claim 15 wherein the processor employs a posted write method for accessing the cache memory.

19. A subsystem according to claim 15 further comprising a data transfer control unit for transferring the data between the host computer, the storage units and the cache memory.

20. A subsystem according to claim 15 wherein the processor references the management information in the memory when the storage control unit receives a read request from the host computer, so that the processor determines whether data requested from the host computer is available in the cache memory.

21. A subsystem according to claim 15 wherein when the processor performs a write operation of write data, the processor searches the management information in the memory for the write data stored in the cache memory.

22. A subsystem according to claim 15 wherein when the processor performs a write operation of write data, the processor searches the management information in the memory for a logic address of the write data stored in the cache memory so that the processor determines a write position of the write data in the storage units.

23. A subsystem according to claim 22 wherein the write data is a redundant data.

24. A subsystem according to claim 15 wherein when the processor performs a write operation of write data, the processor searches the management information in the memory for write data stored in the cache memory so that redundant data is generated by using the write data.

25. A subsystem according to claim 24 wherein the redundant data is generated asynchronously with I/O processing for the host computer.

26. A subsystem comprising a storage control unit and a plurality of storage units for storing data from a host computer wherein the storage control unit includes:
   a cache memory for temporarily storing data transferred between the host computer and the storage units;
   a processor for controlling the storage control unit; and
   a memory, which is accessed at a higher speed by the processor than the cache memory is accessed by the processor, the memory for storing management information about the data stored in the cache memory,
   wherein the management information comprises one or more of a data attribute required for managing the data in the cache memory, a logic address of the data in the cache memory designated by the management information, an available area information in the cache memory, and priority for replacing contents of the cache memory,
   wherein when the processor performs a write operation of write data, the processor searches the management information in the memory for a logic address of the write data stored in the cache memory so that the processor determines a write position of the write data in the storage units.

27. A subsystem according to claim 26 wherein the memory stores a control program for controlling the storage control unit.

28. A subsystem according to claim 26 wherein the memory comprises a volatile memory.

29. A subsystem according to claim 26 wherein the processor employs a posted write method for accessing the cache memory.

30. A subsystem according to claim 26 further comprising a data transfer control unit for transferring the data between the host computer, the storage units and the cache memory.

31. A subsystem according to claim 26 wherein the processor references the management information in the memory when the storage control unit receives a read request from the host computer, so that the processor determines whether data requested from the host computer is available in the cache memory.

32. A subsystem according to claim 26 wherein the processor further searches the management information in the memory for the write data stored in the cache memory.

33. A subsystem according to claim 26 wherein the write data is a redundant data.

34. A subsystem comprising a storage control unit and a plurality of storage units for storing data from a host computer wherein the storage control unit includes:
   a cache memory for temporarily storing data transferred between the host computer and the storage units;
   a processor for controlling the storage control unit; and
   a memory, which is accessed at a higher speed by the processor than the cache memory is accessed by the processor, the memory for storing management information about the data stored in the cache memory,
   wherein the management information comprises one or more of a data attribute required for managing the data in the cache memory, a logic address of the data in the cache memory designated by the management information, an available area information in the cache memory, and priority for replacing contents of the cache memory,
   wherein when the processor performs a write operation of write data, the processor searches the management information in the memory for write data stored in the cache memory so that redundant data is generated by using the write data.

35. A subsystem according to claim 34 wherein the memory stores a control program for controlling the storage control unit.

36. A subsystem according to claim 34 wherein the memory comprises a volatile memory.

37. A subsystem according to claim 34 wherein the processor employs a posted write method for accessing the cache memory.

38. A subsystem according to claim 34 further comprising a data transfer control unit for transferring the data between the host computer, the storage units and the cache memory.

39. A subsystem according to claim 34 wherein the processor references the management information in the memory when the storage control unit receives a read request from the host computer, so that the processor determines whether data requested from the host computer is available in the cache memory.

40. A subsystem according to claim 34 wherein the processor further searches the management information in the memory for the write data stored in the cache memory.

41. A subsystem according to claim 34 wherein the redundant data is generated asynchronously with I/O processing for the host computer.

* * * * *